W. A. JOHNSON.
POTATO BUG EXTERMINATOR.
APPLICATION FILED NOV. 29, 1920.
1,415,359.
Patented May 9, 1922.
2 SHEETS—SHEET 1.
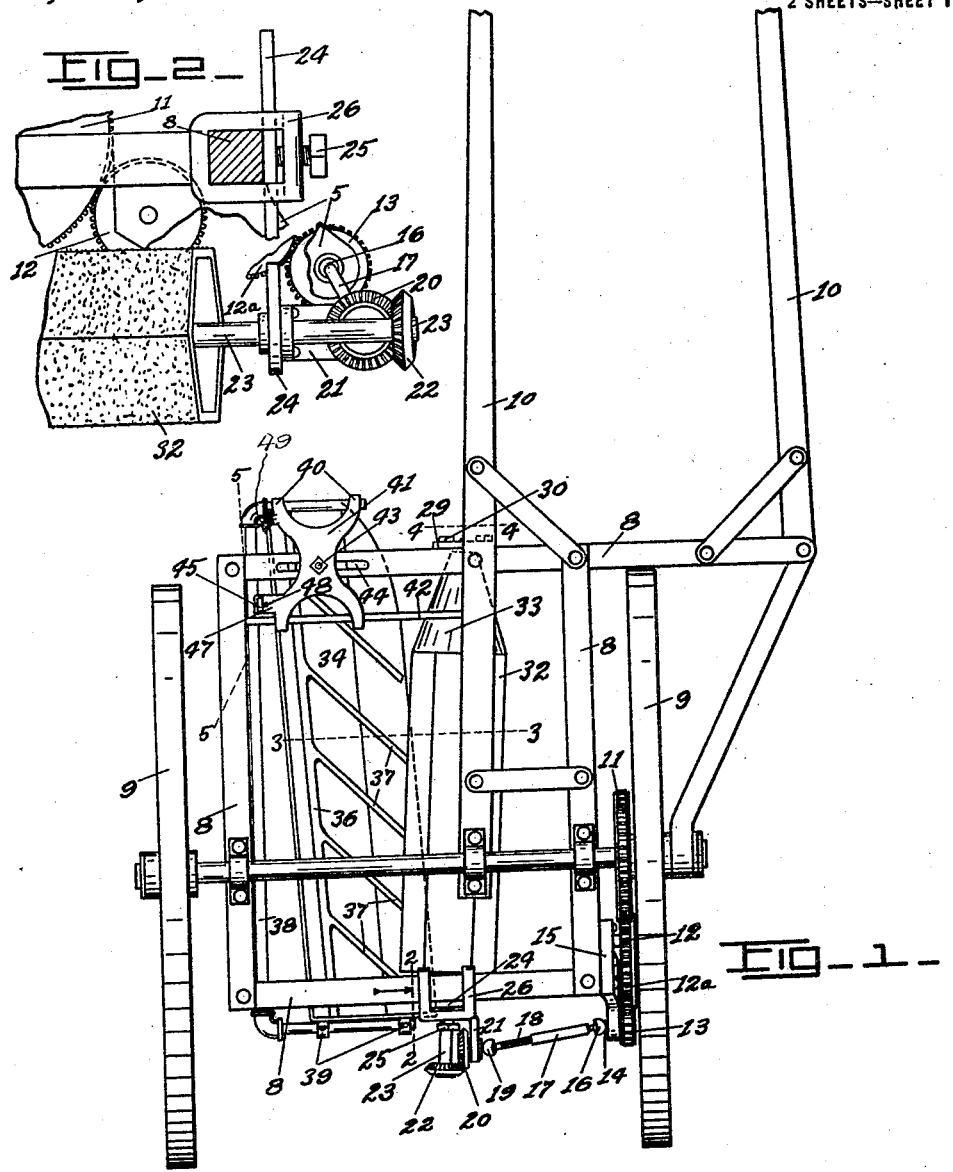
Inventor
WALTER A. JOHNSON
By A. E. Carlsen.
Attorney

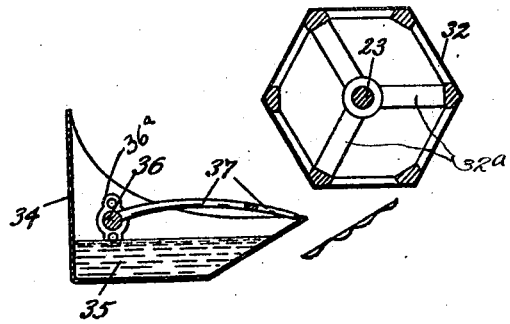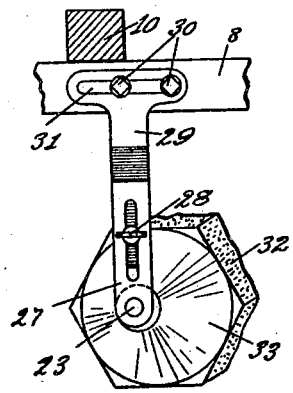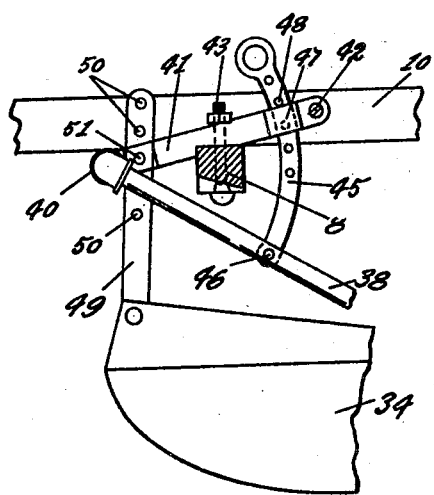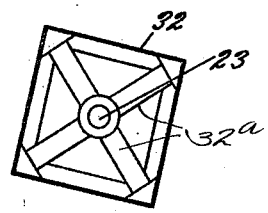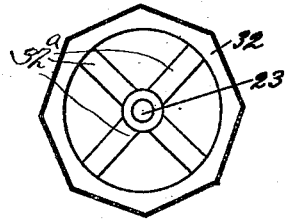

UNITED STATES PATENT OFFICE.

WALTER A. JOHNSON, OF ROCHESTER, MINNESOTA, ASSIGNOR TO PIONEER MANUFACTURING COMPANY, OF ALBERT LEA, MINNESOTA, A CORPORATION OF MINNESOTA.

POTATO-BUG EXTERMINATOR.

1,415,359.     Specification of Letters Patent.     Patented May 9, 1922.

Application filed November 29, 1920. Serial No. 427,099.

*To all whom it may concern:*

Be it known that I, WALTER A. JOHNSON, a citizen of the United States, residing at Rochester, in the county of Olmsted and State of Minnesota, have invented certain new and useful Improvements in Potato-Bug Exterminators, of which the following is a specification.

This invention relates to potato bug destroyers and the main object is to provide a practical machine for gathering and killing potato bugs and other similar insects in an efficient and speedy manner. Further objects will be disclosed in the course of the following specification, and in the accompanying drawings, in which:

Fig. 1 is a top or plan view of the machine.

Fig. 2 is an enlarged detail sectional view as seen substantially on the line 2—2 in Fig. 1.

Fig. 3 is an enlarged detail sectional view on the line 3—3 in Fig. 1.

Fig. 4 is an enlarged detail sectional view on the line 4—4 in Fig. 1.

Fig. 5 is an enlarged detail sectional view on the line 5—5 in Fig. 1.

Figs. 6 and 7 are end views of modified forms of the agitating drum.

Referring to the drawings by reference characters, 8 designates a frame which is supported on two suitable ground wheels 9. The machine as shown is adapted to be drawn by a horse hitched to the thills 10; but it is understood that it may be so constructed that it may be propelled by hand, by a tractor or any other suitable source of power.

Fixed to the hub of one of the wheels 9 is a gear 11, which, by means of two idler gears 12 and 12$^a$, drives a pinion 13 which is fixed on a short shaft 14. The shaft 14 is journaled in a bracket 15, fixed on the frame 8, and has at its inner end a universal joint 16 to which is secured a shaft 17. The shaft 17 is provided with a squared longitudinal hole in which slidably engages a square shaft 18. A universal joint 19 connects the shaft 18 to a bevel pinion 20 which is journaled in a bracket 21. The pinion 20 meshes with a second pinion 22 which is secured on the end of the drum shaft 23. The rear end of the shaft 23 is journaled in a vertical journal member 24, which is slidably secured by a set screw 25 between a securing member 26 and a part of the frame 8. As will be seen in Figs. 1 and 2 both vertical and horizontal adjustments of the member 24 may be made by releasing and again securing the set screw 25. The front end of the shaft 23 (see Fig. 4) is journaled in a member 27 which is vertically slidable on a bolt in a bracket 29, to which it may be secured by a thumb nut 28. The bracket 29 is horizontally adjustable on and secured to the frame 8 by bolts 30 engaging the slot 31.

A multilateral drum 32 consisting of a suitable frame 32$^a$ and having a conical front end 33 is secured on the shaft 23. The drum is covered with a rough material, preferably such as carpeting, and in cross section is conveniently made hexagonal, as shown in Figs. 1, 2, 3 and 4, but quadrilateral or octagonal drums, as shown respectively in Figs. 6 and 7, may also be used.

Suspended from the left side of the frame 8, and with its rear end extending slightly under the drum 32, is a receiving pan 34, which contains a suitable amount of poisonous liquid 35, such as kerosene, paris green solution or turpentine. A longitudinal bar 36 resting with its ends in bearings 36$^a$ extends from one end of the pan to the other and is provided with a series of rearwardly inclined curved guides 37, which prevent the potato plants from being knocked into the poison 35.

The rear end of the pan 34 is suspended by an inclined pipe hanger 38 which is pivotally secured at 39 at its lower end to the pan, and at its upper end is swingingly secured at 40 in an adjusting member 41. The member 41 is at its rear end slidable on a transverse rod 42 which is secured between the frame 8 and the thill 10, and is further supported at its middle on the frame 8 (see Figs. 1 and 5). A bolt 43 extends through the member 41 and a slot 44 in this part of the frame, thus enabling the member 41 to be transversely adjusted and secured in various positions; it being obvious that when such adjustments are made corresponding movements of the pan 34 to and from the drum 32 will also be effected.

The rear end of the pan 34 is adjusted vertically by means of a segment 45, which is pivotally connected at 46 to the hangers 38. Said segment is slidable in a projection 47 of the member 41 and is provided with spaced perforations adapted to be engaged by a pin 48.

The front end of the pan may be suspended in any suitable manner, a preferred way being shown in Fig. 5, wherein, a flexible strap 49 has a series of perforations 50, any one of which may be buttoned over a stud 51, thus enabling the height of the front end of the pan to be adjusted.

With a pan supporting device as thus described, it is obvious that either or both ends of the pan may be vertically adjusted as desired, and will provide means whereby it may yield upwardly when passing over bumps or high places on the ground.

In the operation of the machine, as it is being pulled forward over the row of potatoes, the plants will be guided in between the front end of the pan and the conical portion of the drum 32. As the plants are drawn in between the narrowing space between the drum and the pan they are quite violently shaken toward the pan by the many sides of the drum, which, of course, rotates very rapidly, with the result that the bugs which may be on the plant are shaken into the poison and destroyed.

It is understood that this specification and the accompanying drawings are purely illustrative of my invention and shall not be interpreted in a limiting sense, but that the invention may also embody suitable modifications, provided however, that such modifications come within the spirit and scope of the appended claims.

Having now therefore fully shown and described my invention what I claim to be new and desire to protect by Letters Patent is:

1. A machine of the class described consisting of a suitable frame supported on wheels, a receiving pan suspended under one side of the frame, a multilateral drum journaled to rotate in contiguous relation to the pan, and operative connection between said drum and one of said wheels, said drum being conical at its forward end.

2. A machine of the class described consisting of a suitable frame supported on wheels, a poisonous liquid containing receiving pan suspended under one side of the frame, a shaft journaled in suitable bearings on the frame, operative connection between the shaft and one of said wheels, a multilateral drum secured on the shaft, and a conical member connecting one end of the drum and the forward end of the shaft.

3. A machine of the class described consisting of a wheel supported frame, a receiving pan suspended under one side of the frame, means under the other side of the frame for agitating plants toward the pan as the machine moves forward, a guide bar journaled at its ends to the ends of the pan and extending longitudinally thereof, and guides integral with the guide bar, said guides extending angularly across the pan.

4. A machine of the class described consisting of a suitable wheel supported frame, a receiving pan suspended under one side of the frame, means for agitating plants toward the pan from one side thereof as the machine moves forward, bearings at the ends of the pan, a guide bar journaled in said bearings and guides integral with said bar extending angularly across the pan.

In testimony whereof I affix my signature.

WALTER A. JOHNSON.